United States Patent [19]
Deschamps

[11] 3,831,722
[45] Aug. 27, 1974

[54] INDEPENDENT POWER TAKE OFF CLUTCH BRAKE

[75] Inventor: Joseph P. Deschamps, Naperville, Ill.

[73] Assignee: International Harvester Company, Chicago, Ill.

[22] Filed: Sept. 27, 1972

[21] Appl. No.: 292,584

[52] U.S. Cl. .............. 192/18 R, 192/98, 192/110 B
[51] Int. Cl. ............................................. F16d 67/02
[58] Field of Search ................ 192/18 R, 98, 110 B

[56] References Cited
UNITED STATES PATENTS
| | | |
|---|---|---|
| 1,626,427 | 4/1927 | Reed .................................. 192/98 X |
| 2,258,237 | 10/1941 | Bockius et al .................. 192/107 M |
| 2,727,162 | 12/1955 | Fuge .............................. 192/18 R |
| 2,758,718 | 8/1956 | Flannery et al. ............... 192/18 R X |
| 2,985,992 | 5/1961 | Dowdle .......................... 192/18 R X |
| 3,445,991 | 5/1969 | Hanson et al. ................. 192/18 R X |

FOREIGN PATENTS OR APPLICATIONS
971,609   9/1964   Great Britain ....................... 192/98

Primary Examiner—Benjamin W. Wyche
Attorney, Agent, or Firm—John A. Schaerli; Floyd B. Harman

[57] ABSTRACT

A brake and disengagement assembly for a clutch mechanism which is pivotally connected to the actuation lever such that input forces are evenly distributed.

1 Claim, 3 Drawing Figures

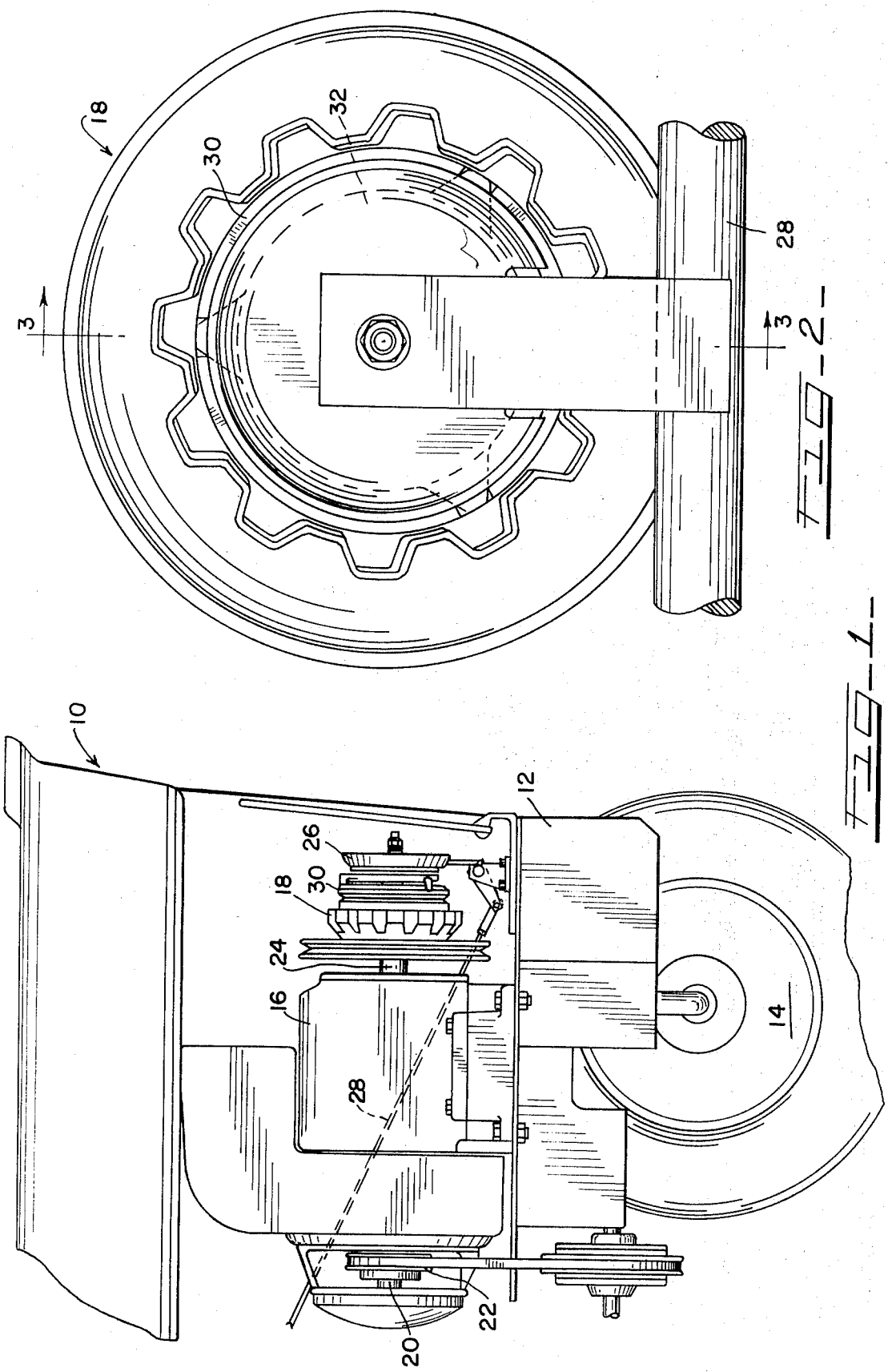

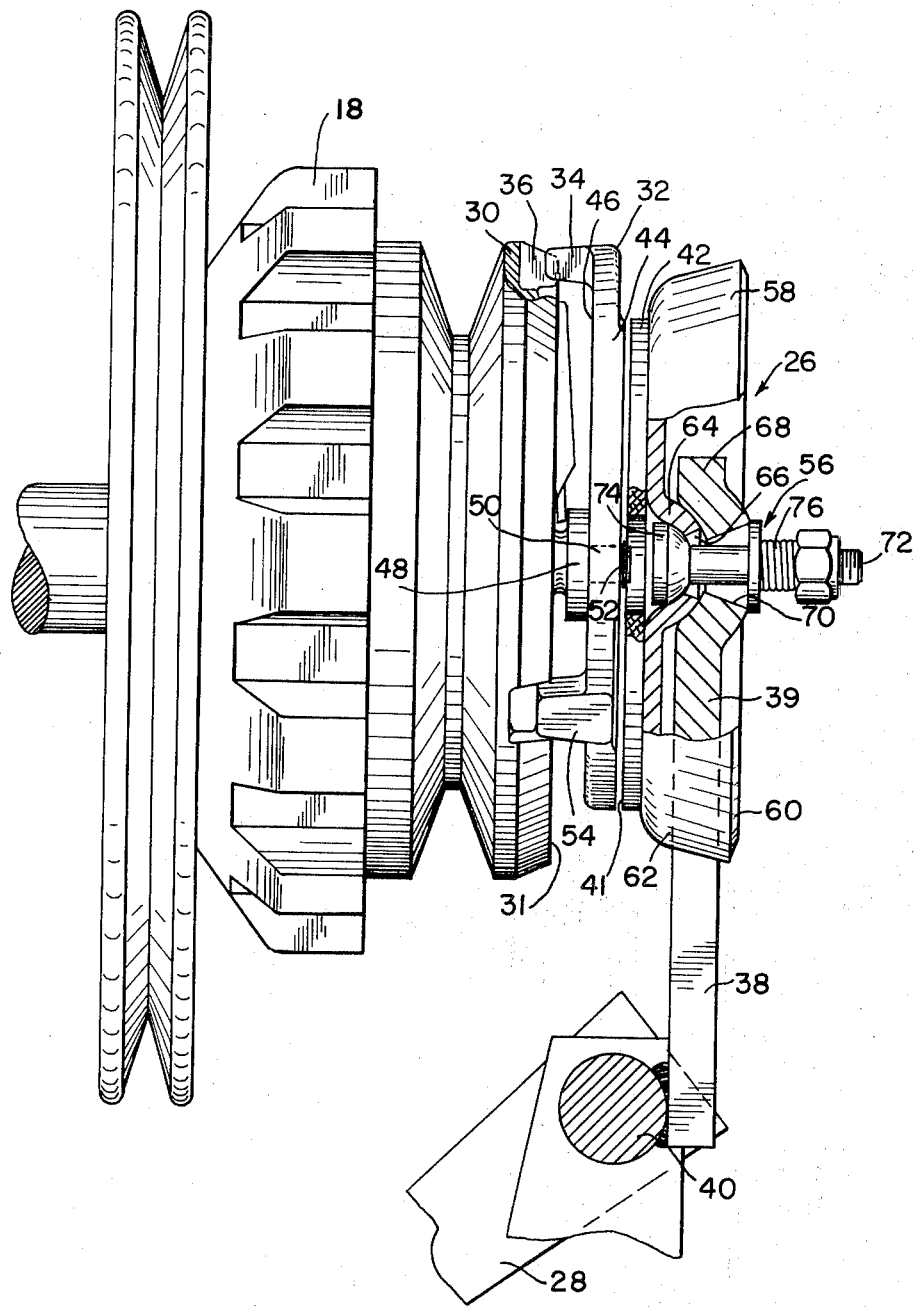
FIG_3

INDEPENDENT POWER TAKE OFF CLUTCH BRAKE

This invention relates generally to friction clutches, and more particularly it relates to braking and disengaging assemblies therefor. Friction clutches of this nature are of quite general application as evidenced by U.S. Pat. No. 3,175,663 to Glesmann. Frictional clutches such as these, however, tend to transmit force even when disengaged simply through internal drag. This transmission of energy or force through internal drag becomes substantially more prevelent when there is no implement connected to the drive belt. Further, with the advent of the use of frictional clutches of this nature in small garden type tractors it becomes necessary, for reasons of safety, to stop as well as disengage the driven implement with a high degree of speed.

Therefore an object of this invention is to provide an assembly which will both disengage and brake the frictional clutch.

Another object of this invention is to provide a disengaging and braking assembly which is pivotable to provide uniform force transfer across the entire working surface.

Still another object of this invention is to provide a disengaging and braking assembly which can be adapted to fit existing frictional clutches.

Similarly another object of this invention is to provide a pivotable arrangement which corrects for misalignment between the brake shoe and the brake disk.

In accordance with the invention a brake assembly for an independent power takeoff clutch is provided which disengages the clutch and stops motion thereof. A brake disk is suitably mounted on the frictional clutch preferably sitting adjacent the disengaging means such that, as the brake shoe forces it inward with stopping, the clutch disengages. A convenient mechanical linkage system is used to urge the brake shoe against the surface of the brake disk. The connection or junction between the mechanical lever means and the brake shoe is a wear and force compensating means, that is of a pivotal nature such that the brake shoe can realign itself to provide even force distribution against the brake disk.

Other objects and advantages of the invention will become apparent upon reading the following detailed description and upon reference to the drawings, in which;

FIG. 1 is a fragmentary view of a typical tractor having a friction clutch and incorporating the disengaging brake assembly;

FIG. 2 is an end view showing the structure of the mechanical actuation means and the disengaging brake assembly; and FIG. 3 is a side elevational sectional view taken along the line 3—3 of FIG. 2 and showing the disengaging brake assembly in detail.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning now in particular to FIG. 1, the tractor 10 will be seen to include a frame 12 supported on a conventional axle and wheel assembly 14. The engine 16 and frictional clutch 18 are also of conventional construction such as disclosed in U.S. Pat. No. 3,175,663 to Glesmann.

The engine 16 is shown provided with a rearwardly extending drive shaft 20 to which is secured a drive pulley 22. Additionally power is taken from the shaft 20 via shaft 24, for driving associated equipment forwardly of engine 16. Incorporated in this forwardly extending drive assembly means 17 is the frictional clutch means 18 and the pivotal disengaging and braking mechanism 26. The actuation of the latter assembly being acheived through the mechanical linkage system means 28.

Turning now to FIGS. 2 and 3 it will be observed that the front face 31 of friction clutch pulley means 30 is notched. Correspondingly the brake disk means 32 has fingers or projections 34 (as more clearly shown in FIG. 3) which extend down into and key with the grooves 36 in the front face of the pulley means 30 as is slidingly moved from left to right. The actuating linkage assembly 28 being seen as extending, via lever means 38, to the center of the disengaging and braking assembly 26 and upon actuation causing the assembly to move in a plane perpendicular to that of the paper. It should be noted that brake disk 32 is spring loaded such that when not used it assumes the position as shown in FIG. 3.

Referring now to FIG. 3 wherein the frictional clutch is shown in an egaged position and the disengaging and braking means 26 is shown in a de-activated position. Upon actuation of the mechanical lever means 28, arm means 38 pivots inwardly or to the left around pivot point 40. As the lever means 38 pivots around point 40 the brake shoe means 42 is forced against the leading surface 44 of brake disk means 32. Flush against the back surface means 46 of brake disk 32 is clutch de-activation button 48, the secured relationship being maintained by an extension means 50 fixed to button 48 and extending forwardly thereof. The extension means 50 journals brake disk 32 and is removably secured thereto by a snap ring means 52 or other suitable securing devices. As is apparent as disengaging and braking means 26 moves to the left the finger means 34 move into the slots 36 allowing the clutch de-activation button 48 to be activated, with the simultaneous dissipation of the rotational energy of the friction clutch assembly 18. As soon as the friction clutch is disengaged from the driving shaft 24 the assembly is brought to an immediate stop by furthered and continued actuation of braking and disengaging means 26. It is to be noted here that brake shoe means 42 functions as a thrust bearing means as well as a brake means.

In order to allow a constant even distribution of forces by braking and disengaging means 26 against brake disk 32 the juncture or connecting means 56 is of a pivotal nature. That is the junction between lever means 38 and braking and disengaging means 26 allows pivotal motion therebetween. Thereby, the total surface area 41 of the asbestos pad means 42 becomes available for both braking and thrust purposes. Thus, if for some reason uneven force was presented against face 44 pivoting would result with the subsequent realignment therebetween.

The braking and disengaging means 26 includes a series of components. Beginning on the left with the frictional pad means 42 which is in turn fixed to brake supporting or brake shoe means 58. The brake shoe means 58 can be any means suitable for supporting the pad means 42, however in the preferred embodiment it has an outer raised edge 60 which is notched at 62 sufficiently to provide access for the end portion 39 of lever means 38. Centrally located therein is a spherical curved portion 64 having an aperture means 66. The spherical section means 64, or in the preferred embodiment semi-spherical, is adjacent a large substantially identical curved spherical section 68 struck from lever means 38. The curved portions 64 and 68 are sized such that portion 64 when positioned adjacent portion 68 creating a ball and socket like relationship.

The spherical or preferrably semi-spherical section 68 of lever means 38 is also provided with an aperture 70, said aperture 70 and said aperture 66 being provided with a spring loaded securing means 72. In the preferred embodiment thereof spring loaded means 72 is a nut and bolt means head portion 74 of which has a semi-sherical curved portion which matches the curved portion of semi-spherical section 64. As is apparent upon tightening of nut and bolt means 72 spring means 76 maintains the components in a firm yet flexible manner, that is the components have no tendency to flop or move, yet are restrainedly free to pivot in order to compensate for an uneven distribution of forces. It should be further noted that the fitting of end portion 39 of lever means 38 in groove 62 prevents any axial rotation of brake shoe means 58.

A brake assembly for an IPTO clutch mechanism is provided. The brake assembly disengages and stops drag motion of the clutch mechanism, and includes a series of components. The first of these is an actuation lever which carries the assembly and through which the operator activates the assembly. Secondly there is a brake shoe supporting means. Thirdly a wear and force compensating means is provided between the two, securing them such that they are pivotable. Lastly a brake disk exists carried by the IPTO clutch, to which is transferred the stopping and disengaging forces from the brake shoe support means.

Thus it is apparent that there has been provided, in accordance with the invention, a disengaging and braking means that fully satisifies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An IPTO clutch mechanism in combination with a brake assembly which disengages and stops motion of the clutch mechanism comprising:

an actuator lever means;

a brake disk means transferring stopping and disengaging forces to said IPTO clutch when moved axially;

a brake shoe means including a plate means having an asbestos means secured thereto; and a wear and force compensating means connecting said actuator lever to said brake shoe means including only a single universal joint comprising a spring loaded ball and socket means located on the central axis of said IPTO clutch and brake means whereby pivotal movement is possible to achieve maximum contact between said asbestos means and said brake disk means.

* * * * *